United States Patent
Sarfraz et al.

(10) Patent No.: US 11,496,492 B2
(45) Date of Patent: Nov. 8, 2022

(54) MANAGING FALSE POSITIVES IN A NETWORK ANOMALY DETECTION SYSTEM

(71) Applicant: HEWLETT PACKARD ENTERPRISE DEVELOPMENT LP, Houston, TX (US)

(72) Inventors: Unum Sarfraz, Santa Clara, CA (US); Mohan Parthasarathy, Santa Clara, CA (US); Brijesh Nambiar, Santa Clara, CA (US); Min-Yi Shen, Santa Clara, CA (US); Viswesh Ananthakrishnan, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 307 days.

(21) Appl. No.: 16/540,969

(22) Filed: Aug. 14, 2019

(65) Prior Publication Data
US 2021/0051165 A1    Feb. 18, 2021

(51) Int. Cl.
G06F 21/00    (2013.01)
H04L 9/40    (2022.01)

(52) U.S. Cl.
CPC ...... H04L 63/1425 (2013.01); H04L 63/0245 (2013.01); H04L 63/0263 (2013.01); H04L 63/145 (2013.01); H04L 63/1416 (2013.01)

(58) Field of Classification Search
CPC ............ H04L 63/1425; H04L 63/1416; H04L 63/0245; H04L 63/0263; H04L 63/145; H04L 63/20; H04W 12/121
See application file for complete search history.

(56) References Cited

U.S. PATENT DOCUMENTS

| | | | |
|---|---|---|---|
| 9,202,052 | B1 | 12/2015 | Fang et al. |
| 10,459,827 | B1 * | 10/2019 | Aghdaie ................ A63F 13/67 |
| 2006/0034305 | A1 | 2/2006 | Heimerdinger et al. |
| 2012/0209592 | A1 * | 8/2012 | Cherepanov ........... G06F 40/55 704/9 |
| 2015/0127595 | A1 | 5/2015 | Hawkins, II et al. |
| 2015/0195296 | A1 * | 7/2015 | Vasseur ................. G06N 20/00 726/23 |
| 2015/0229661 | A1 * | 8/2015 | Balabine ............. H04L 63/0227 726/22 |

(Continued)

OTHER PUBLICATIONS

Raftopoulos E. et al., Detecting, Validating and Characterizing Computer Infections in the Wild, (Research Paper), IMC, Nov. 2-4, 2011, 13 Pgs., ACM, Berlin, Germany.

*Primary Examiner* — Trong H Nguyen
*Assistant Examiner* — Michael M Lee
(74) *Attorney, Agent, or Firm* — Sheppard Mullin Richter & Hampton LLP

(57) ABSTRACT

Systems and methods are provided for managing false positives in a network anomaly detection system. The methods may include receiving a plurality of anomaly reports; extracting fields, and values for the fields, from each of the anomaly reports; grouping the anomaly reports into a plurality of groups according to association rule learning, wherein each group is defined by a respective rule; for each group, creating a cluster based on common values for the fields; and marking each cluster as a possible false positive anomaly cluster.

18 Claims, 6 Drawing Sheets

(56) References Cited

U.S. PATENT DOCUMENTS

| | | | |
|---|---|---|---|
| 2016/0127319 A1* | 5/2016 | Xiong | G06N 5/025 |
| | | | 726/1 |
| 2016/0248624 A1 | 8/2016 | Tapia et al. | |
| 2016/0371489 A1* | 12/2016 | Puri | G06F 16/254 |
| 2017/0063887 A1* | 3/2017 | Muddu | G06F 16/9024 |
| 2017/0193078 A1* | 7/2017 | Limonad | H04L 63/1425 |
| 2017/0250954 A1* | 8/2017 | Jain | H04L 63/1416 |
| 2018/0375886 A1* | 12/2018 | Kirti | H04L 41/28 |
| 2019/0149565 A1* | 5/2019 | Hagi | G06N 20/00 |
| | | | 726/23 |
| 2019/0342307 A1* | 11/2019 | Gamble | H04L 63/1416 |
| 2020/0167785 A1* | 5/2020 | Kursun | H04L 63/1425 |

* cited by examiner

MANAGING FALSE POSITIVES IN A NETWORK ANOMALY DETECTION SYSTEM

DESCRIPTION OF RELATED ART

The disclosed technology relates generally to data communication networks, and more particularly some embodiments relate to the security of such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Modern enterprise network security methods report a large number of anomalies. Each anomaly describes a possible network security breach. While many of these anomalies are false positives, each anomaly must be presented for human review. This process creates a significant human workload.

The present disclosure describes technology for automatically clustering similar anomalies. Instead of presenting individual anomalies, the clusters are presented for human analysis, thereby significantly reducing the human workload.

Figure 1:
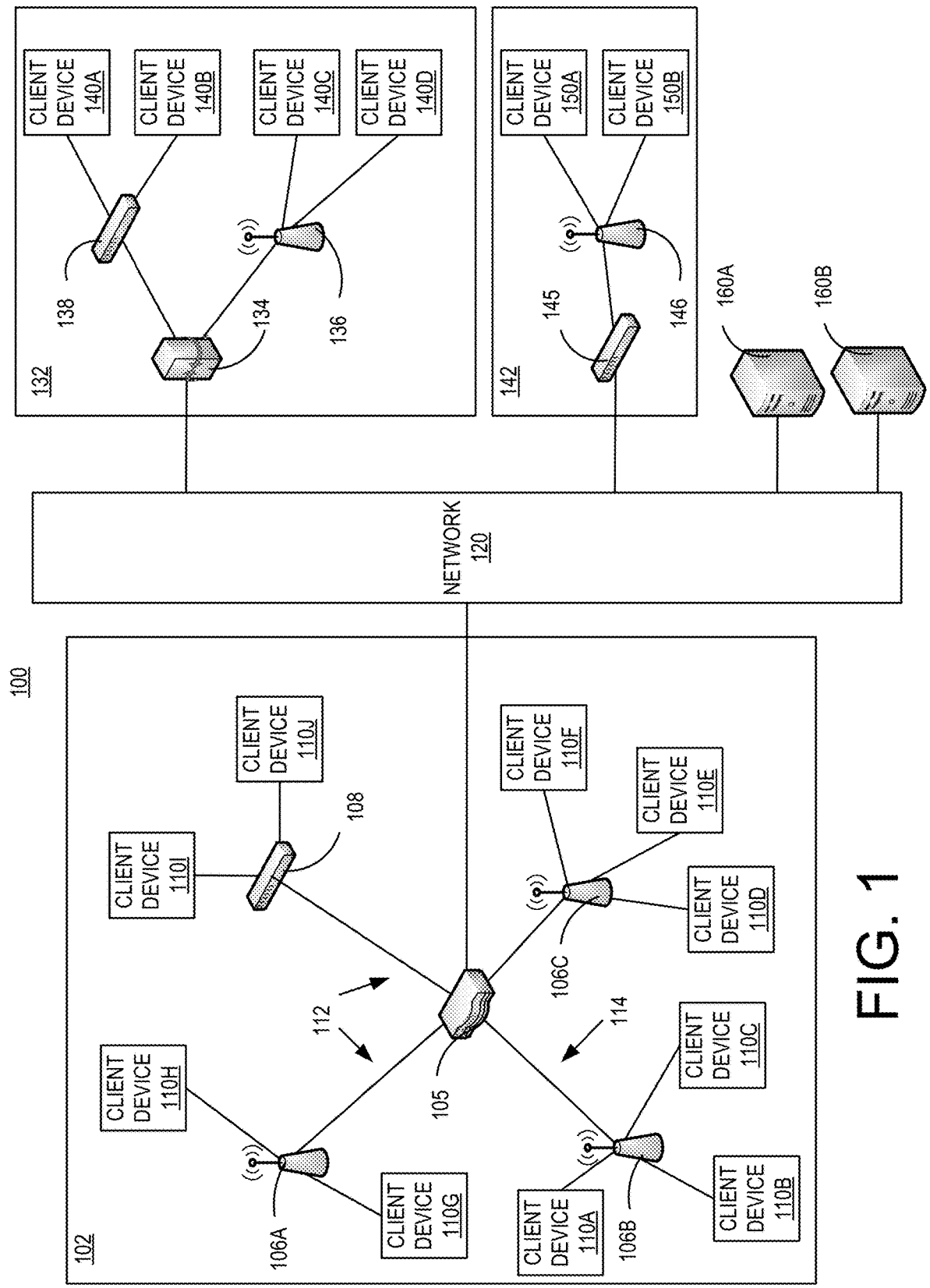
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 105 in communication with the network 120. The controller 105 may provide communication with the network 120 for the primary site 102, though it may not be the only point of communication with the network 120 for the primary site 102. A single controller 105 is illustrated, though the primary site may include multiple controllers and/or multiple communication points with network 120. In some embodiments, the controller 105 communicates with the network 120 through a router (not illustrated). In other embodiments, the controller 105 provides router functionality to the devices in the primary site 102.

A controller 105 may be operable to configure and manage network devices, such as at the primary site 102, and may also manage network devices at the remote sites 132, 142. The controller 105 may be operable to configure and/or manage switches, routers, access points, and/or client devices connected to a network. The controller 105 may itself be, or provide the functionality of, an access point.

The controller 105 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 105 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 105. APs 106a-c communicate with the controller 105 and the network over connections 112 and 114, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 105 at the primary site 102, and the controller 105 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 145 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 105 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 132 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
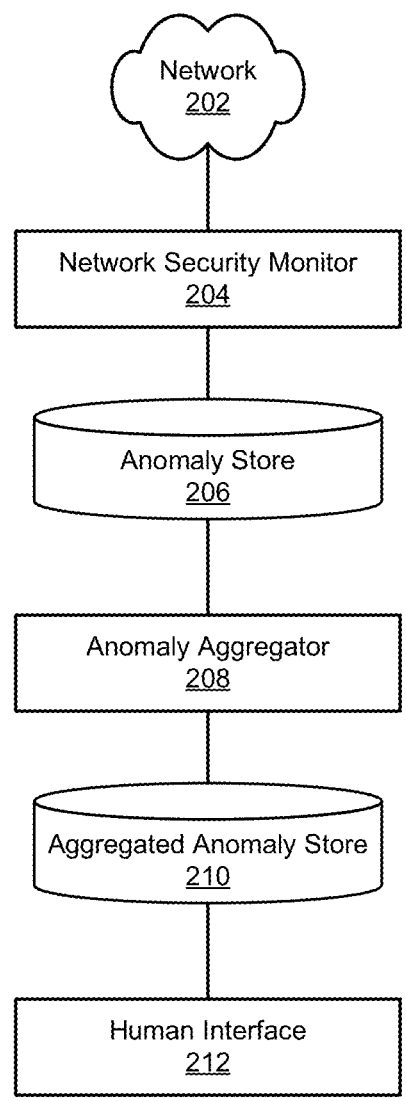
FIG. 2 illustrates a system for managing false positives in a network anomaly detection system according to embodiments of the disclosed technology.

FIG. 2 illustrates a system for managing false positives in a network anomaly detection system according to embodiments of the disclosed technology. Referring to FIG. 2, the system includes a communications network 202. The network 202 may be, for example, an enterprise network.

The system may include a network security monitor 204. The network security monitor 204 monitors the network 202 for anomalies. The anomalies may be behavior-based. For example, the anomalies may be generated based on the deviation of an entity from its historical normal behavior. As another example, the anomalies may be generated based on the deviation of an entity from the behavior of its peers. For example, an anomaly may be generated for a user when the user's behavior deviates from the behavior of other users in the same department. Each entity may be, for example, a user, network address, network host, network device, or the like, or any combination thereof.

The system may include an anomaly store 206. The anomaly store 206 may store reports of the anomalies. The anomaly reports may be generated by the network security monitor 204. The anomaly store 206 may be implemented as a database or the like.

The system may include an anomaly aggregator 208. The anomaly aggregator 208 may aggregate a plurality of the anomalies into an aggregated anomaly, as described in detail below. In general, the anomaly aggregator 208 aggregates anomalies according to common patterns detected in the anomaly reports stored in the anomaly store 206.

The system may include an aggregated anomaly store 210. The aggregated anomaly store 210 may store reports of the aggregated anomalies generated by the anomaly aggregator 208. The aggregated anomaly store 210 may be implemented as a database or the like.

The system may include a human interface 212. The human interface 212 may allow a human to explore the aggregated anomaly reports stored in the aggregated anomaly store 210. For example, the human interface may allow a human to receive alerts of aggregated anomalies, to view reports of aggregated anomalies, to mark aggregated anomalies as false positive, and the like.

Figure 3:
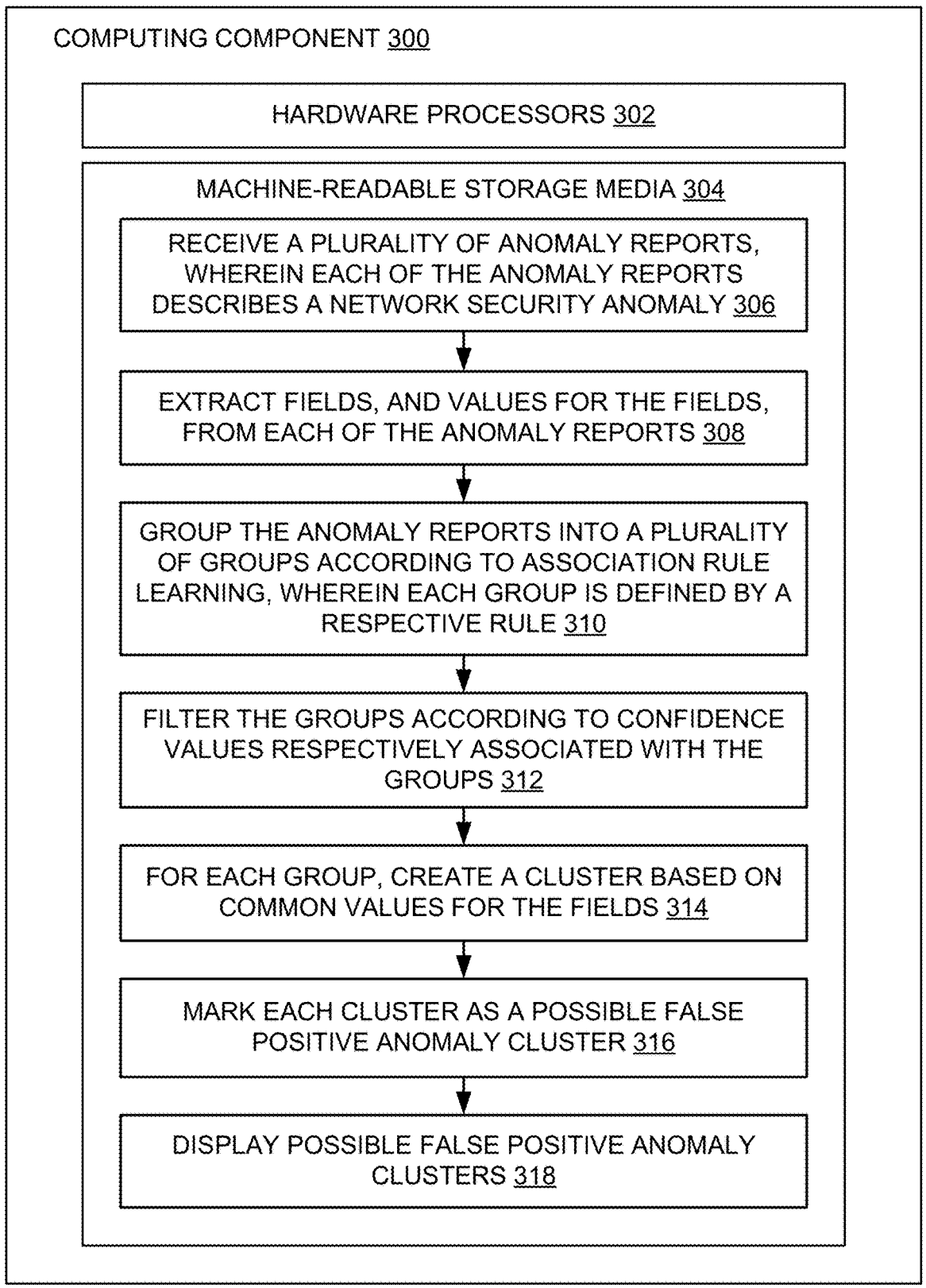
FIG. 3 is a block diagram of an example computing component or device for doing the invention in accordance with one embodiment.

FIG. 3 is a block diagram of an example computing component or device 300 for doing the invention in accordance with one embodiment. Computing component 300 may be, for example, a server computer, a controller, or any other similar computing component capable of processing data. In the example implementation of FIG. 3, the computing component 300 includes a hardware processor 302, and machine-readable storage medium 304. In some embodiments, computing component 300 may be an embodiment of the network security monitor 204, the anomaly aggregator 208, the human interface 212, or any combination thereof.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-318, to control processes or operations for doing stuff. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-318. Depending on the implementation, the instructions may include additional, fewer, or alternative instructions, and may be performed in various orders or in parallel.

Hardware processor 302 may execute instruction 306 to receive a plurality of anomaly reports. Each anomaly report may describe a network security anomaly. In the example of FIG. 2, the anomaly aggregator 208 may ingest anomaly reports from the anomaly store 206.

Hardware processor 302 may execute instruction 308 to extract fields, and values for the fields, from each of the anomaly reports. In the example of FIG. 2, the anomaly aggregator 208 may extract the fields and values from the anomaly reports ingested from the anomaly store 206. Different anomaly reports may be configured with different fields. The anomaly aggregator 208 may extract the configured fields from each anomaly report. For all host name fields, the anomaly aggregator may extract the top level domains (TLDs). The anomaly aggregator may use the TLDs both for aggregation, and for marking aggregated anomalies as possible false positives. As used herein, a possible false positive anomaly is an anomaly that is reported as requiring human or other verification. Example fields include username, user_department, user_email, src_host_name, dest_host_name, src_ip, dest_ip, service_name, status_code, status_detail, logon_type_name, application_id, dest_country.

Hardware processor 302 may execute instruction 310 to group the anomaly reports into a plurality of groups according to association rule learning, wherein each group is defined by a respective rule. In the example of FIG. 2, the anomaly aggregator 208 may group the anomaly reports.

In some embodiments, to group the anomaly reports, the anomaly aggregator 208 may apply a frequent pattern growth algorithm to the anomaly reports. In such embodiments, the anomaly aggregator 208 may pass the extracted fields and values to an API for the frequent pattern growth algorithm. The algorithm may build a suffix tree for the most common patterns detected. The algorithm may use the suffix tree to create rules defining the groups.

Hardware processor 302 may execute instruction 312 to filter the groups according to confidence values respectively associated with the groups. A confidence value may be defined as a ratio of a number of anomalies containing a rule to a total number of anomalies of that type. For example, for an alert called "Large Data Upload," if a total of 100 anomalies were generated in the past 3 months, and 50 of those have the rule dept: finance and user_name: johndoe, then the confidence for that rule is 50%.

Figure 4:
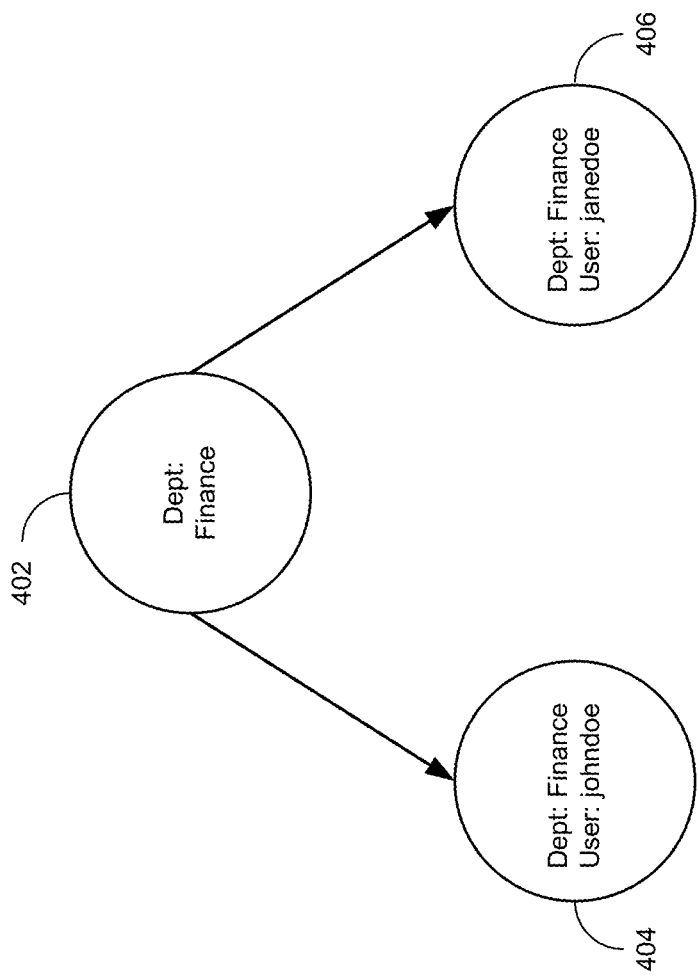
FIG. 4 illustrates a simple example of a directed graph.

In the example of FIG. 2, the anomaly aggregator 208 may filter the groups. In some embodiments, the rules may be ingested into a directed graph. The nodes of the graph with no predecessors may be selected as root notes. FIG. 4 illustrates a simple example of a directed graph. Referring to FIG. 4, the directed graph includes a root node 402. The root node 402 has a field named "Dept." and has a value for that field of "Finance." The root node 402 is directed to subsidiary nodes 404 and 406, both of which inherit the fields and values of the root node 402. The subsidiary nodes 404, 406 include a further field named "User." For that field, the node 404 has a value of "johndoe," while the node 406 has a value of "janedoe."

The anomaly aggregator 208 may perform a traversal of the directed graph for each root node. For example, the traversal may be a Depth First Traversal (DFS) traversal. Two checks may be applied to each rule in the subgraph of a root node. First, the anomaly aggregator 208 may discard groups having confidence values below a determined confidence threshold. For example, confidence values may be expressed as a confidence percentage, and rules having confidence values below 60% may be discarded. Second, the rule with the highest cardinality, that is, the highest number of fields, may be chosen. The chosen rule may define a cluster that contains all the anomalies having common field values. In some embodiments, one anomaly may belong to multiple clusters.

In some embodiments, before the filtering process, and after grouping the anomaly reports, the anomaly aggregator 208 may select a portion of the groups according to the rules. For example, the anomaly aggregator 208 may sort the rules in descending order according to an average field occurrence ratio of common patterns, and may select a determined number of the rules from the top of the resulting list. For example, the anomaly aggregator 208 may select the top 50 rules. In such embodiments, the anomaly aggregator 208 may filter only the selected groups, that is, the groups defined by the selected rules.

Hardware processor 302 may execute instruction 314 to create a cluster for each group based on common values for the fields. In the example of FIG. 2, the anomaly aggregator 208 may create the clusters. In some embodiments, the anomaly aggregator 208 may create each cluster by selecting the rule in the group with the highest number of the fields.

Hardware processor 302 may execute instruction 316 to mark each cluster as a possible false positive anomaly cluster. In the example of FIG. 2, the anomaly aggregator 208 may mark the clusters as possible false positive. The anomaly aggregator 208 may store the marked clusters as aggregated anomalies in the aggregated anomaly store 210. In some embodiments, the aggregated anomalies may be stored to facilitate querying and filtering. In some embodiments, the querying and filtering may be implemented using the Introspect Query Language (IQL) and the Elasticsearch search engine.

In some embodiments, the above instructions may be executed repeatedly, for example on an occasional basis, a periodic basis, or the like. In such embodiments, the anomaly reports may be selected according to a sliding window of a determined duration. For example, every hour, anomaly reports from the preceding three months may be ingested and aggregated as described above.

Hardware processor 302 may execute instruction 318 to display a view of one of the possible false positive anomaly clusters. In the example of FIG. 2, the human interface 212 may display a view of one of the possible false positive anomaly clusters automatically as a way of alerting a human operator of the existence of the cluster. As another example, a human operator may employ the human interface 212 to select and view one or more of the clusters.

Figure 5:
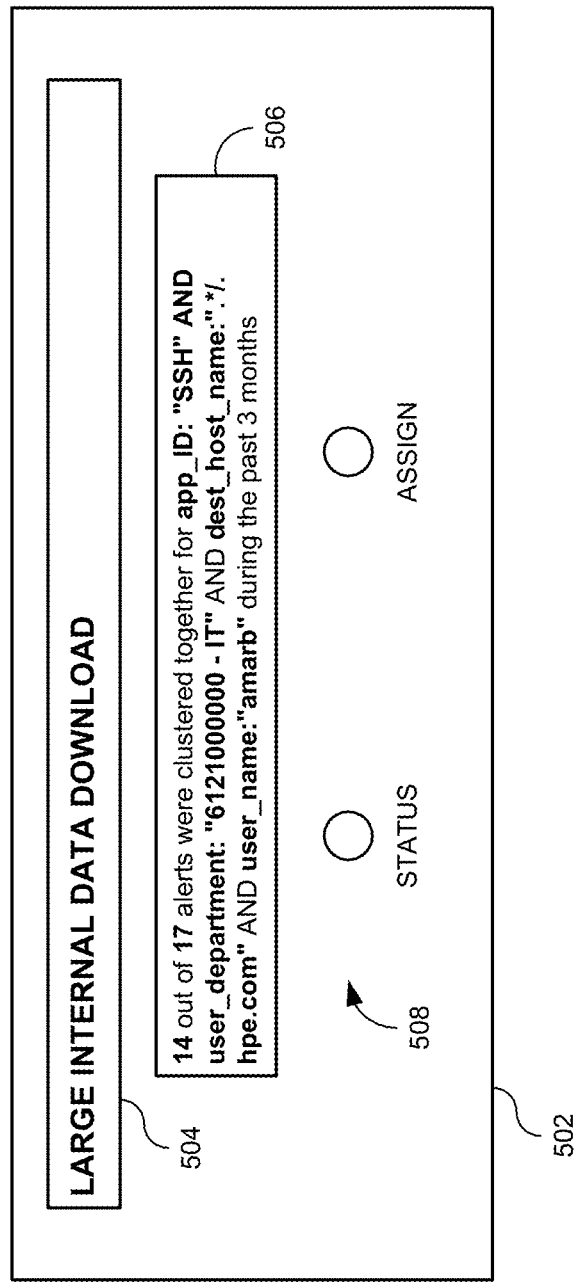
FIG. 5 illustrates an example view of a cluster, also referred to herein as an aggregated anomaly.

FIG. 5 illustrates an example view of a cluster, also referred to herein as an aggregated anomaly. In the example of FIG. 5, the view may be presented as a card 502, which may be shown in a larger interface window. The interface window may include other tools such as a query box, status indicators, and the like. In the example of FIG. 5, the card 502 includes a type box 504 for the cluster. The type indicates the pattern common to the anomalies aggregated in the cluster. In this example, the type shown in the type box 504 indicates that the aggregated anomalies relate to large internal data downloads. A card 502 may also include a details box 506 that describes details common to the aggregated anomalies. In the example of FIG. 5, the contents of the details box 506 indicate that, over the past three months, 14 anomalies were clustered together, and that the common patterns for the aggregated anomalies included app ID, department, username, and host domain.

The card 502 may include one or more controls and status indicators 508. In some embodiments, the controls 508 may allow a human operator to change the status of the cluster from open to closed, thus marking the cluster as a false positive. In some embodiments, the controls 508 may allow a human operator to assign the cluster to an analyst for further investigation.

Figure 6:
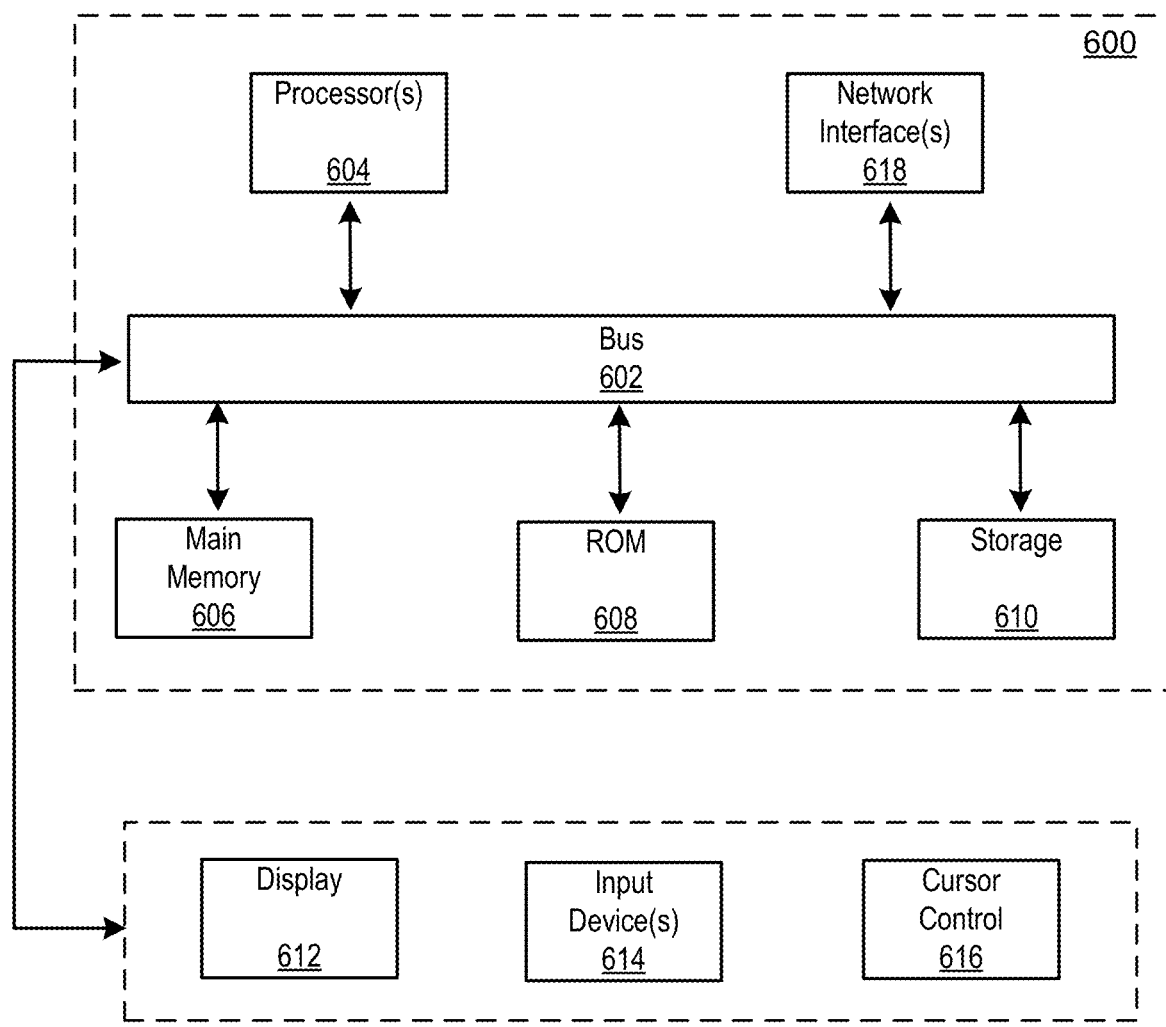
FIG. 6 depicts a block diagram of an example computer system 600 in which embodiments described herein may be implemented.

FIG. 6 depicts a block diagram of an example computer system 600 in which embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or a WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a hardware processor; and
a non-transitory machine-readable storage medium encoded with instructions executable by the hardware processor to perform a method comprising:
receiving a plurality of anomaly reports, wherein each of the plurality of anomaly reports describes a network security anomaly;
extracting fields, and values for the fields, from each of the plurality of anomaly reports;
generating a suffix tree of the values for the fields, wherein the suffix tree comprises the values for the fields corresponding with possible security breaches that are split into subsidiary nodes that are each common to the network security anomaly;

clustering a plurality of groups from the suffix tree;
generating a respective rule for each of the plurality of groups according to association rule learning, wherein the respective rule differentiates the plurality of groups from other groups describing distinguishable network security anomalies;
for each group of the plurality of groups, automatically creating one or more clusters that comprises at least one of the plurality of groups and the respective rule;
marking the one or more clusters as a possible false positive anomaly cluster; and
displaying a view of the one or more clusters as the possible false positive anomaly cluster.

2. The system of claim 1, wherein the hardware processor further to perform the method comprising:
applying a frequent pattern growth algorithm to the plurality of anomaly reports.

3. The system of claim 1, wherein the hardware processor further to perform the method comprising:
filtering the plurality of groups according to confidence values respectively associated with the groups after grouping the plurality of anomaly reports and before creating the one or more clusters.

4. The system of claim 3, wherein filtering the plurality of groups according to the confidence values further comprises:
discarding groups having a confidence value below a determined confidence threshold.

5. The system of claim 3, wherein the hardware processor further to perform the method comprising:
selecting a portion of the plurality of groups according to the respective rules after grouping the plurality of anomaly reports and before filtering the plurality of groups.

6. The system of claim 1, wherein creating the one or more clusters comprises:
selecting the respective rule for each of the plurality of groups corresponding with a highest number of the fields.

7. A non-transitory machine-readable storage medium encoded with instructions executable by a hardware processor of a computing component, the machine-readable storage medium comprising instructions to cause the hardware processor to perform a method comprising:
receiving a plurality of anomaly reports, wherein each of the plurality of anomaly reports describes a network security anomaly;
extracting fields, and values for the fields, from each of the plurality of anomaly reports;
generating a suffix tree of the values for the fields, wherein the suffix tree comprises the values for the fields corresponding with possible security breaches that are split into subsidiary nodes that are each common to the network security anomaly;
clustering a plurality of groups from the suffix tree;
generating a respective rule for each of the plurality of groups according to association rule learning, wherein the respective rule differentiates the plurality of groups from other groups describing distinguishable network security anomalies;
for each group of the plurality of groups, automatically creating one or more clusters that comprises at least one of the plurality of groups and the respective rule;
marking the one or more clusters as a possible false positive anomaly cluster; and
displaying a view of the one or more clusters as the possible false positive anomaly cluster.

8. The non-transitory machine-readable storage medium of claim 7, wherein the instructions further cause the hardware processor to perform the method comprising:
applying a frequent pattern growth algorithm to the plurality of anomaly reports.

9. The non-transitory machine-readable storage medium of claim 7, wherein the instructions further cause the hardware processor to perform the method comprising:
filtering the plurality of groups according to confidence values respectively associated with the groups after grouping the plurality of anomaly reports and before creating the one or more clusters.

10. The non-transitory machine-readable storage medium of claim 9, wherein filtering the plurality of groups according to the confidence values further comprises:
discarding groups having a confidence value below a determined confidence threshold.

11. The non-transitory machine-readable storage medium of claim 9, wherein the instructions further cause the hardware processor to perform the method comprising:
selecting a portion of the plurality of groups according to the respective rules after grouping the plurality of anomaly reports and before filtering the plurality of groups.

12. The non-transitory machine-readable storage medium of claim 7, wherein creating the one or more clusters comprises:
selecting the respective rule for each of the plurality of groups corresponding with a highest number of the fields.

13. A method comprising:
receiving a plurality of anomaly reports, wherein each of the plurality of anomaly reports describes a network security anomaly;
extracting fields, and values for the fields, from each of the plurality of anomaly reports;
generating a suffix tree of the values for the fields, wherein the suffix tree comprises the values for the fields corresponding with possible security breaches that are split into subsidiary nodes that are each common to the network security anomaly;
clustering a plurality of groups from the suffix tree;
generating a respective rule for each of the plurality of groups according to association rule learning, wherein the respective rule differentiates the plurality of groups from other groups describing distinguishable network security anomalies;
for each group of the plurality of groups, automatically creating one or more clusters that comprises at least one of the plurality of groups and the respective rule;
marking the one or more clusters as a possible false positive anomaly cluster; and
displaying a view of the one or more clusters as the possible false positive anomaly cluster.

14. The method of claim 13, further comprising:
applying a frequent pattern growth algorithm to the plurality of anomaly reports.

15. The method of claim 13, further comprising:
filtering the plurality of groups according to confidence values respectively associated with the groups after grouping the plurality of anomaly reports and before creating the one or more clusters.

16. The method of claim 15, wherein filtering the plurality of groups according to the confidence values further comprises:
discarding groups having a confidence value below a determined confidence threshold.

17. The method of claim 15, further comprising:
selecting a portion of the plurality of groups according to the respective rules after grouping the plurality of anomaly reports and before filtering the plurality of groups.

18. The method of claim 13, wherein creating the one or more clusters comprises:
selecting the respective rule for each of the plurality of groups corresponding with a highest number of the fields.

* * * * *